April 19, 1927.  1,625,353
T. DUGAN
STRAW SPREADER
Filed April 20, 1925   2 Sheets-Sheet 1
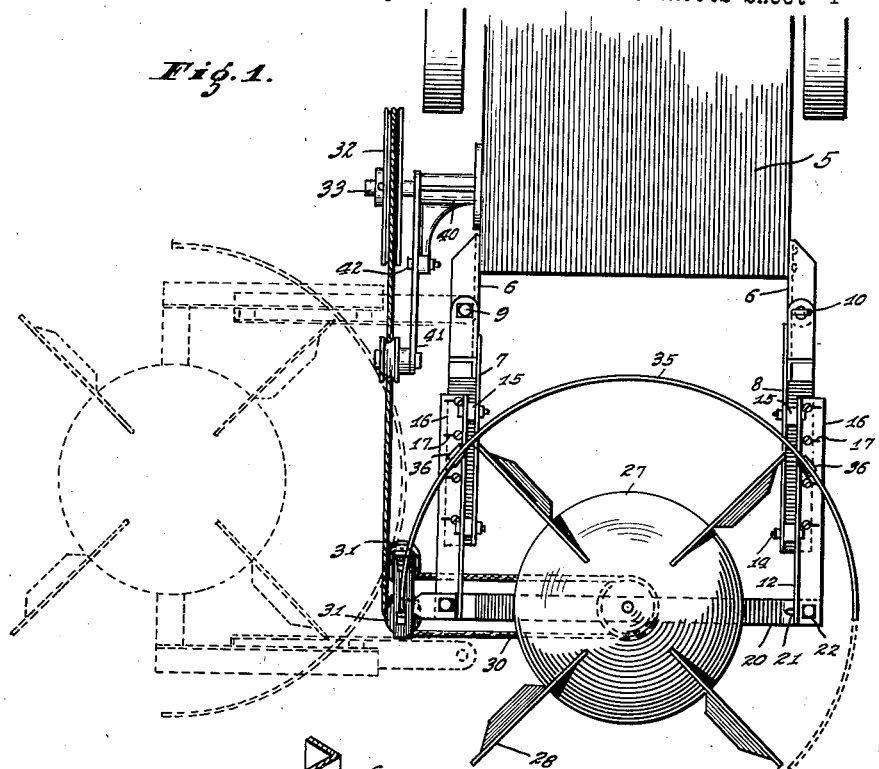
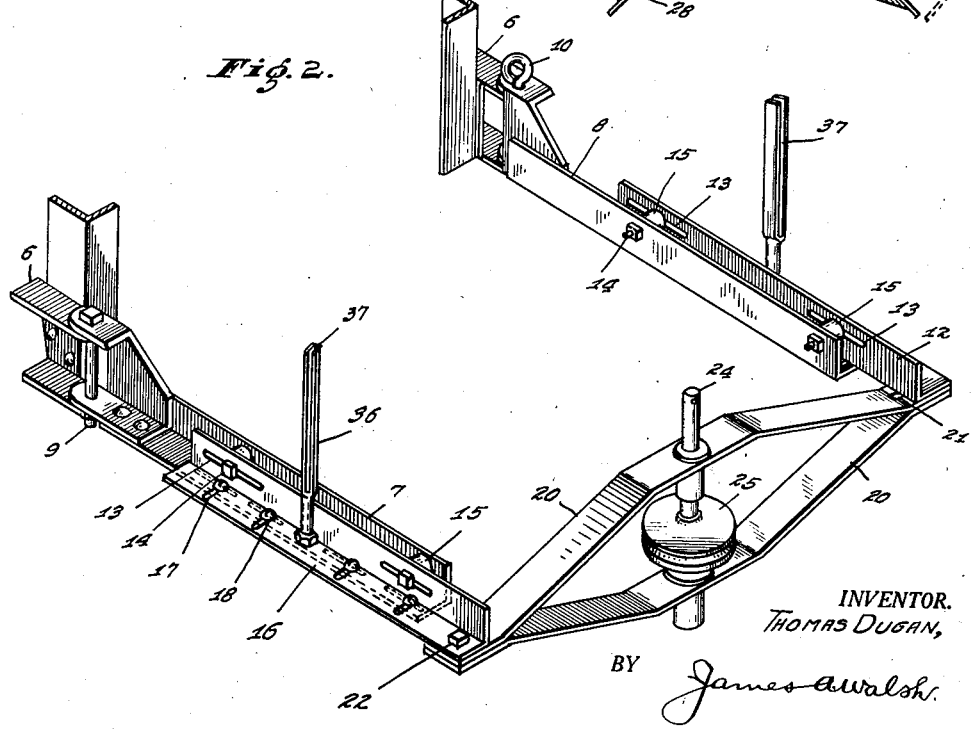
INVENTOR.
THOMAS DUGAN,
BY James A. Walsh
ATTORNEY.

April 19, 1927.
T. DUGAN
STRAW SPREADER
Filed April 20, 1925  2 Sheets-Sheet 2
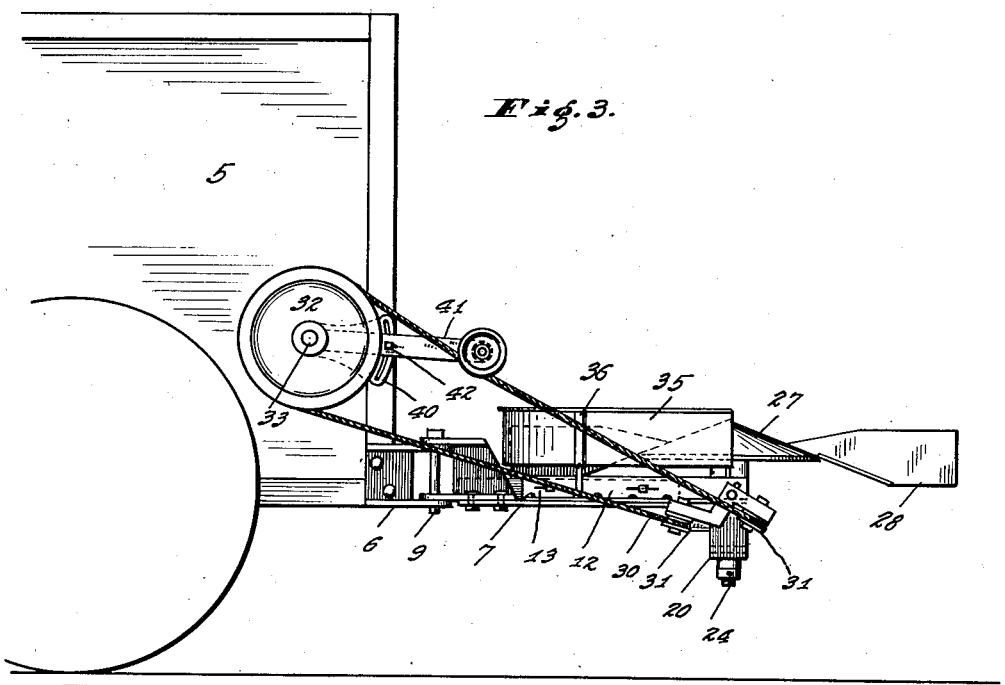
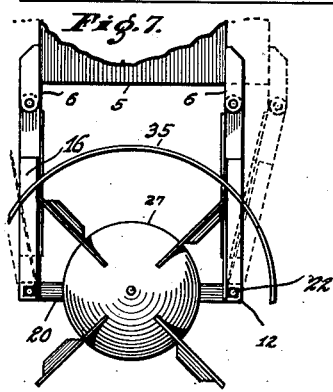
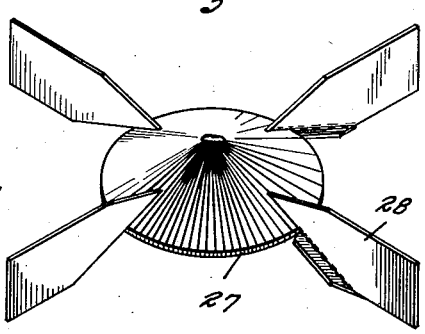
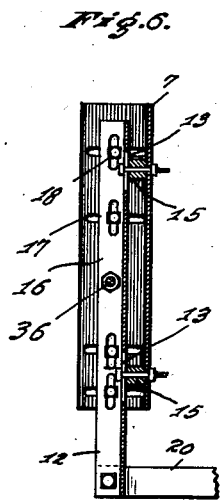
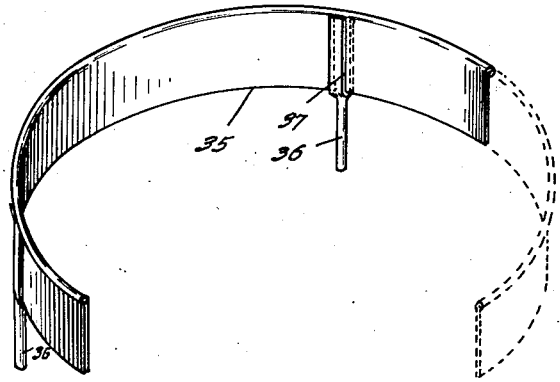
INVENTOR.
THOMAS DUGAN,
BY James A. Walsh
ATTORNEY.

Patented Apr. 19, 1927.

1,625,353

UNITED STATES PATENT OFFICE.

THOMAS DUGAN, OF WICHITA, KANSAS, ASSIGNOR TO J. I. CASE THRESHING MACHINE COMPANY, OF RACINE, WISCONSIN, A CORPORATION.

STRAW SPREADER.

Application filed April 20, 1925. Serial No. 24,437.

In the operation of combination harvester-threshers the straw discharging from the thresher element of the machine as it moves through the grain field falls in such uneven masses as not to be in suitable condition for plowing under the soil, and therefore it is desirable to provide means for intercepting the falling straw and scattering and spreading it over the soil in substantially uniform condition. This I accomplish by my improved straw spreader, comprising means whereby it may be readily attached to threshers of different widths, projected and retracted to predetermined distances from the machine, and swung to one side thereof when access to the interior of the thresher is required, all as will now be more particularly described.

In the accompanying drawings forming part hereof, Figure 1 is a plan of my improved straw spreader attached to the rear end of a thresher; Fig. 2 a perspective of the framework; Fig. 3 a side elevation; Fig. 4 a perspective of the fan which I employ; Fig. 5 a perspective of an adjustable guard forming part of the spreader, and Figs. 6 and 7 plan views of modified forms of adjustable frames embodying the principle of my invention.

In said drawings the portions marked 5 indicate a thresher to which my improved spreader is attached by brackets, 6, or otherwise. Said spreader comprises supporting members, 7, 8, one of which, as 7, is hingedly connected to bracket 6 by a pintle, 9, and the member 8 is secured by a removable pin, 10. Said members are preferably formed of angle-iron upon which is supported the side bars, 12, the latter provided with slots, 13, and connected to the members, 7, 8, by bolts, 14, and said members and bars may be held in spaced relation by rollers or washers, 15. By the slotted connections described it will be apparent that the side bars 12 can be projected and retracted in relation to the thresher and secured in adjusted positions.

The lower webs, 16, of side bars 12 are provided with slots, 17, and are adjustably secured to the supporting members by bolts, 18. Said side bars 12 at their outer ends are connected to a frame, 20, preferably trussed, the ends of which are slotted, at 21, for the reception of bolts, 22, by which arrangement of slotted connections I am enabled to vary the width of the spreader to accommodate it to machines of different widths, and by employing the rollers 15 or other spacing devices a stable relation is maintained between said side bars and their supporting members.

Upon said frame 20 I support a shaft, 24, provided with a pulley, 25, and mount a rotatable fan or spreader at the upper end of said shaft. Said fan comprises a disk, 27, cone-shaped or otherwise, provided with comparatively broad blades, 28, and is rotated by an endless rope, 30, passing around said pulley 25, thence over sheaves, 31, to a pulley, 32, connected to a shaft, 33, of the threshing machine, but, as is obvious, any appropriate driving power for the fan may be employed.

Said fan or spreader is partially encircled by a guard, 35, which is adjustably mounted upon the spreader frame in any desired manner, that illustrated comprising the standards, 36, embodying a slot, 37, in which said guard may be fitted and shifted to the left or right, the latter adjustment being indicated by dotted lines in Fig. 1. In this simple manner said guard may be adjusted to control the spreading of straw at either side of the path of the moving machinery and which can be readily accomplished during field operations.

It will thus be seen that under conditions where the straw discharging from the thresher does not fall within the proper range in relation to the rotating fan for the most effective distribution I am enabled to adjust said fan and its guard accordingly by projecting or retracting the spreader, that I am enabled by the simple adjustment described to apply the spreader frame to different sized machines, and also to swing the spreader as a whole to one side of the machine when access is required to the interior thereof. Being thus subjected to various adjustments which may affect the rope connection about the pulley described, I provide a belt tightener for controlling the take-up thereof, said tightener comprising the slotted bracket, 40, mounted on the bearing of shaft, 33, and engaging the swinging sheave-arm, 41, adjustably, by the set screw 42, and which arm is capable of sufficient range of movement to maintain said rope in taut condition during various adjustments of the spreader.

Figs. 6 and 7 show slight modifications of the side bar arrangements, which accomplish the same result as described, the horizontal web of support 7 being wider (Fig. 6) to provide a greater range of movement of said side bars 12; and it will be understood that as said side bars 12 are pivoted to frame member 20 and pivotally attached to brackets 6, as shown in Figs. 2 and 7, said side bars may be adjusted to machines of varying widths, as indicated in Fig. 7.

I claim as my invention:

1. A straw spreader for a threshing machine, comprising a frame, a distributing fan thereon, pivotal means connecting one side of said frame to said machine, and removable means connecting the opposite side of said frame to said machine to permit said spreader to be swung alongside said machine for obtaining access to the interior of the latter.

2. In a straw spreader for a threshing machine, a frame embodying extensible supporting members for positioning the spreader at various distances from the machine, a cross-member connecting the supporting members, a distributing fan on said cross-member, means for actuating the fan, and a hinge connecting one side of the spreader to the machine to permit the spreader to be swung alongside the machine for obtaining access to the interior of the latter.

In testimony whereof I affix my signature.

THOMAS DUGAN.